Figure 1A:
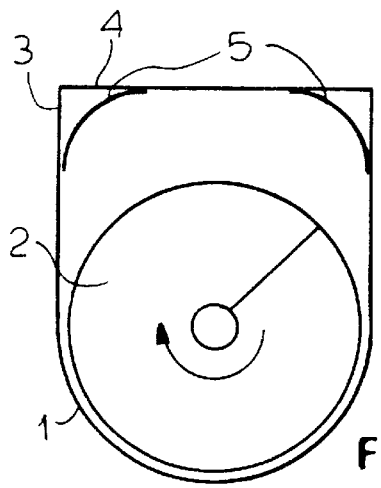
Figure 1B:
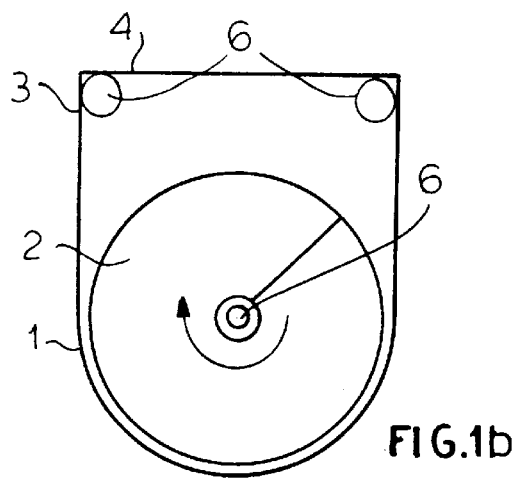
Figure 1C:
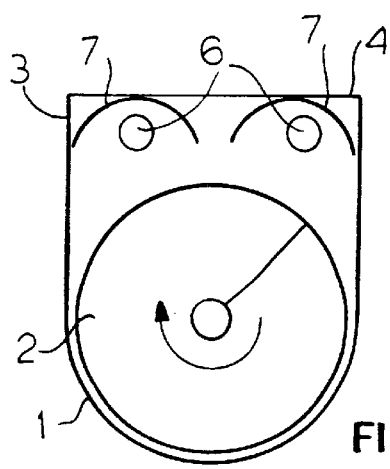
Figure 1D:
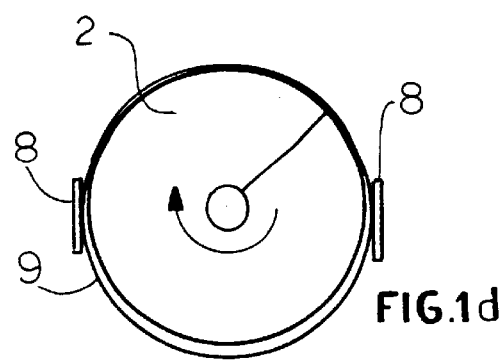
Figure 1E:
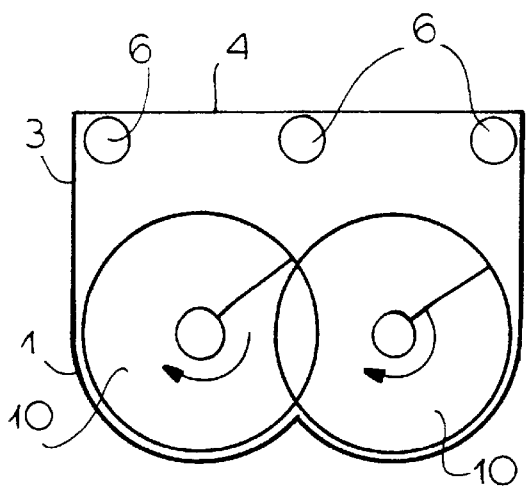
Figure 1F:
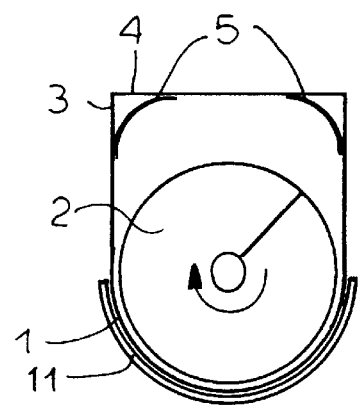

United States Patent [19]
Stricker et al.

[11] Patent Number: 6,035,546
[45] Date of Patent: Mar. 14, 2000

[54] DEVICE FOR HEAT-TREATING BULK MATERIALS IN FEED SCREWS AND BULK MATERIAL DRYING METHOD

[75] Inventors: Urban Stricker, Am Steimel 18, D-57271 Hilchenbach; Martin Siebert, Berlin; Klaus Stricker, Siegen, all of Germany

[73] Assignee: Urban Stricker, Hilchenbach, Germany

[21] Appl. No.: 09/155,711

[22] PCT Filed: Mar. 28, 1997

[86] PCT No.: PCT/EP97/01598

§ 371 Date: Oct. 1, 1998

§ 102(e) Date: Oct. 1, 1998

[87] PCT Pub. No.: WO97/37184

PCT Pub. Date: Oct. 9, 1997

[30] Foreign Application Priority Data

Apr. 2, 1996 [DE] Germany .................... 196 13 125

[51] Int. Cl.[7] ........................................... F26B 3/34
[52] U.S. Cl. ............................. 34/266; 34/147; 34/179
[58] Field of Search ............................. 34/266, 267, 269, 34/147, 179; 110/347, 211, 215, 216; 210/748, 149, 179; 366/323; 426/447, 448, 417

[56] References Cited

U.S. PATENT DOCUMENTS

| | | | |
|---|---|---|---|
| 4,380,496 | 4/1983 | Maffet | 210/780 |
| 4,794,011 | 12/1988 | Schumacher | 426/448 |
| 4,964,227 | 10/1990 | Christiansen | 34/266 X |
| 5,020,237 | 6/1991 | Gross et al. | 34/267 X |
| 5,127,347 | 7/1992 | Cheetham | 110/347 |
| 5,143,626 | 9/1992 | Nugent | 210/748 |

*Primary Examiner*—Stephen Gravini
*Attorney, Agent, or Firm*—Herbert Dubno

[57] ABSTRACT

Device for the thermal treatment of bulk material with a screw conveyor transporting the bulk material which is equipped with infrared heat radiators in a tempering zone, characterized in that the infrared heat radiators are arranged in the screw conveyors in the central area of the rotation diameter. The device is also characterized in that the infrared heat radiators are mounted in a radiation-permeable screw shaft. The walls of a screw trough of the screw conveyor have an infrared-reflecting coating or are made of an infrared-reflecting material.

11 Claims, 2 Drawing Sheets

DEVICE FOR HEAT-TREATING BULK MATERIALS IN FEED SCREWS AND BULK MATERIAL DRYING METHOD

The invention relates to a device by means of which bulk materials can be thermally treated.

A great number of technical variations of screw conveyors is known used to solve the problem of thermal treatment. Likewise many devices are known wherein also bulk materials are thermally treated during continuous transport due to an input of heat radiation. The transport devices used thereby operate according to the principles of belt conveyors, chain conveyors or vibratory conveyors (according to DIN 15 201).

The combination of screw feeding with the input of radiated heat is known from DE-OS 19 06 278, DE-OS 19 22 230, U.S. Pat. Nos. 5,143,626 A and 5,497,562 A. All mentioned specifications show infrared heat radiators mounted outside the perimeter of the effective screw conveyor. This leads on the one hand to a disadvantageous irradiation of the screw parts, on the other hand the distance to the bulk materials equals at least the radius of the screw, whereby the efficiency of the heat transmission remains extremely limited.

The U.S. Pat. No. 4,430,057 A proposes to move a part of the material to be irradiated closer to the infrared radiation source by means of paddles arranged in a screw-like manner.

The DE 23 41 331 A describes a drum drier, wherein the screw shaft is heated by hot combustion gases, whereby it acts as a heat radiation source. The total radiation output is radially radiated over the entire periphery of the screw shaft. The efficiency of this radiation source remains always limited by their low output density in comparison to the electrically powered infrared radiators, as well as by their characteristic peak wave length in the long-wave infrared range (according to the IEC Classification).

It is the object of the present invention to make possible a machine-operated heat treatment with depth penetration of bulk materials in a continuous operation, so that a targeted and quick tempering of the bulk materials can take place in the shortest possible process times, by observing the temperature ranges as closely as possible. The heat treatment can thereby serve for drying and/or for producing targeted changes of further physical or chemical characteristics of the material.

According to the invention this object is achieved due to the features of patent claims 1 or 2, whereby for the transport of the bulk material the principle of screw conveyors is used and heat input for the tempering of the conveyed goods takes place through heat radiation during the transport in the screw conveyor or the screw-tube conveyor.

Further developments and advantages of the invention are the object of the dependent claims.

Due to the invention, especially for the following specific uses, advantages of the screw conveyors can be developed:

Due to the fact that the conveying is based on thrust an overturning of the material takes generally place, at least in the contact area between the bulk material and the thrust-effecting screw flank. This overturning effect is particularly strong in screw-tube conveyors, since here in addition the trough wall is also moved. This overturning supports a uniform thermal irradiation of the conveyed goods and thereby supporting an even tempering.

Due to a zoned layout of the construction of the screw conveyor, process steps preceding or following the actual tempering process can be technically connected into one unit. This way for instance the most accurate and even feeding of the tempering zone in all tempering processes can be attempted. In the concept of vibratory conveyors this is made possible for instance by providing a preceding star valve (see GB-A-1 313 203). In addition to a skillfully provided dosage zone, in the following description other screw conveyor zones advantageous to the invention will also be disclosed.

As advantages specific to the use of tempering by thermal radiation the following can be counted:

quick heat transmission to the bulk materials in-depth penetration of the thermal radiation, i.e. the inside of the bulk material is at least partially heated.

This advantage of the thermal radiation is widely used for instance in the technology of plastic materials, since the plastic materials which in principle have a poor thermal conductivity, can be this way quicker tempered by overcoming the obstructions to heat convection.

According to the invention, through the combination of the principle of the screw conveyor with the principle of heat transmission by heat radiation, numerous tasks in the tempering technique can be advantageously achieved.

The invention is explained with the aid of embodiment examples schematically shown in the drawing.

FIG. 1 shows schematically in cross section the arrangement of rod-shaped infrared radiators 6 inside the screw shaft of the screw 2. For this purpose the screw is hollow and has corresponding openings for the passage of the infrared radiation, so that the conveyed goods are impacted by the infrared radiation. The screw is for instance designed as a standard screw. Other screw shapes, such as a spiral band, a paddle screw or the like, which partially also offer the advantage that the infrared radiation is less shielded towards the conveyed goods, can also be used. Suitably the walls of the screw trough themselves have an IR-reflecting coating or are made of an IR-reflecting material, e.g. aluminum, in order to increase the proportion of effective infrared radiation in the bulk material.

Figure 2:
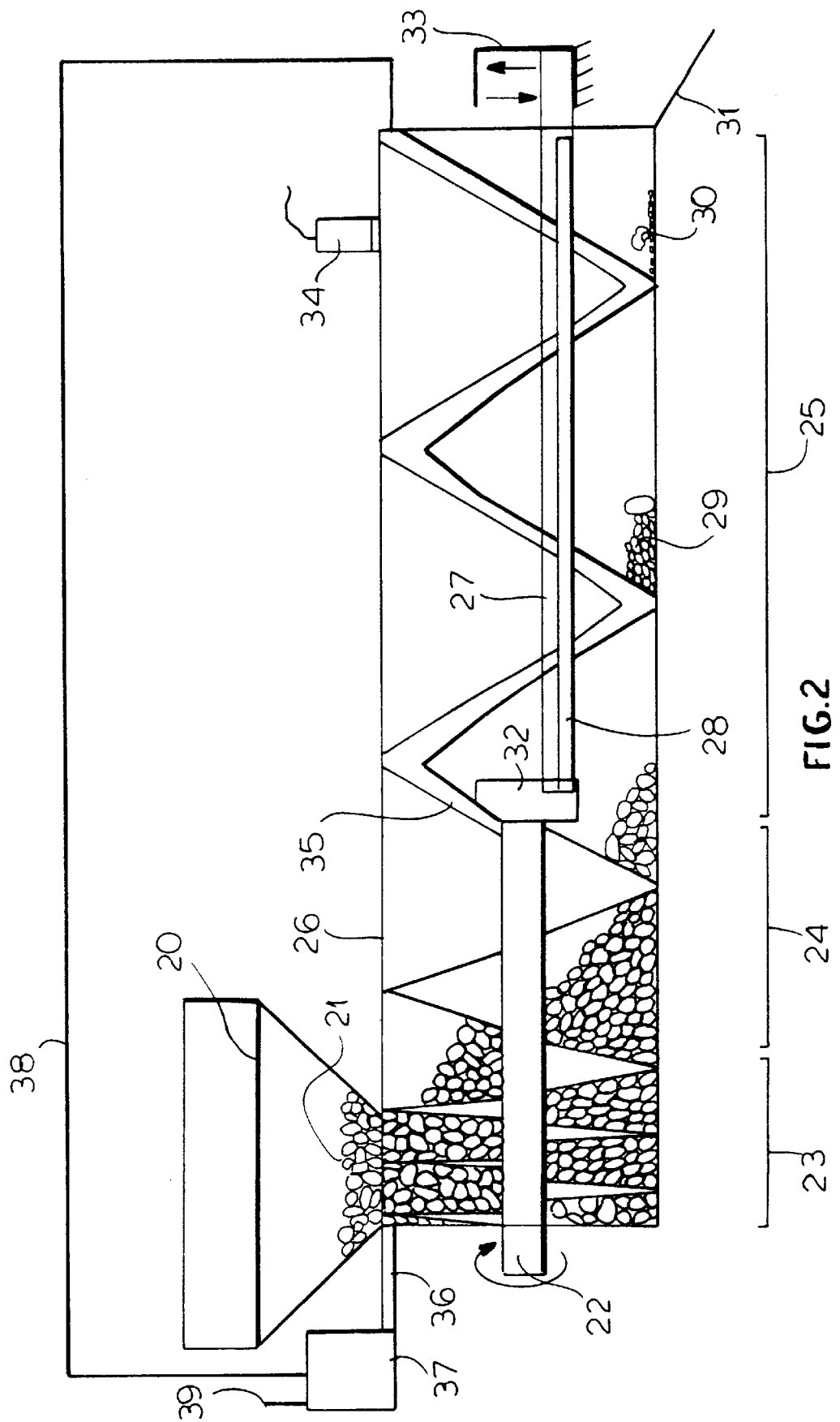

According to the execution possibility shown in FIG. 2 a tempering zone based on screw conveyors is coupled on the feeding side with a so-called intake and dosage zone of the same screw. From a simple storage facility (silo or the like) the material is fed through a funnel at first to a screw designed as a standard screw. The intake zone is designed with respect to the thread volume so that the exact amount of material desired as filling ratio in the further course of the screw is received in the so-called tempering zone. In the dosage zone following the intake zone the thread volume is widened so that at the beginning of the tempering zone the desired filling ratio is reached. This execution possibility of the invention shown in FIG. 2 is for instance illustrated on a screw conveyor. It is also possible to use a screw conveyor in which the feeding of the material takes place axially. The already comminuted material to be treated is introduced in the material feeder 20. An optional comminuting in a comminuting device with subsequent buffer space can take place immediately after the material feeder 20 and before the intake zone. From there it reaches the intake zone of the screw mounted on the drive shaft 22. In the present case, the drive shaft 22 drives the screw with three different functional zones with the same RPM. Through the various screw constructions and pitches 23, 24, 25, different conveying speeds are reached in the individual zones, according to each area wherein the material is located, and thereby different tasks are performed. From the intake zone 23 the material reaches the dosage zone 24, wherein due to the corresponding construction of the screw with reference to pitch, geometry and RPM of the drive shaft 22, it is insured that only strictly limited amounts of the material are pushed upwards into the tempering zone 25 and that the filling ratio $\phi$ is set so that the below-described installation support 27 is kept free of material at all times. This is achieved with a high degree of certainty when $\phi=0.02$ to $0.15$. In the tempering zone 25, which here is selected as a spiral band type of screw, in order to expose the material extensively to the infrared radiation without shielding by screw parts and in order to keep the impact of the radiated heat on the conveying elements to a minimum as a result of the reduced surface of the conveying elements, a support 27 for the installation of the infrared radiator 28 is provided, As indicated here, the support 27 can be supported only unilaterally in the fixed support 33, but depending on length and construction, it can also be supported at both sides, as shown here, by a support 32 corotating with the shaft 22 or it can also be multiply supported., The height of the support 27 beyond the material, respectively the respective deepest point of the tubular screw shell 26 is provided to be adjustable, in order to adjust the intensity setting of the infrared radiation emitted by the infrared radiators 28 to the respective material. This setting according to the material to be treated can be adjusted once when the installation is started, or can be continuously alternated via a contactless measuring temperature sensor 34, fastened for instance outside the tubular screw shell 26 and which measures the temperature through a window, or it can also be fastened to the support 27. By means of the measured signal it is possible to influence for instance the height of the support or any other measured value useful for regulating the effective infrared radiation in the material (such as radiator temperature, number of working radiators, etc.) so that the tempering corresponds to the preset targeted values. The feeding lines for the installations on the support are for instance guided by a rigid or flexible guide from the support of the machine frame.

The material to be treated is transported through the tempering zone 25 and thereby is subjected to the treatment schematically represented as partially treated material 29 and extensively treated material 30. Over a discharge slide 31 the material can be transferred for instance to a further process step. A variation of the spiral band 35 can consist in that the band is made of a hollow material, through which a heating medium can for instance run in a cycle, in order to stably temper the screw itself, and as an additional effect, to heat or optionally cool, also the material to be treated. The same possibilities apply also to the screw parts in the dosage zone 24 and in the intake zone 23.

The illustration in FIG. 2 with a closed tubular screw shell 26 also offers the advantageous possibility to aspire possible emissions (e.g. dust, odors, etc) resulting from the treatment together with the heated air via the material feeder 20 or to retain them in subsequently arranged filters, or as shown as an example to aspire them at 36 in the screw intake area and to deliver them to a conveying and filtering unit 37. The air can thereby be optionally filtered and released into the atmosphere at 39 or recycled extensively via an air circulation duct to be used in the tempering zone 25 for the tempering of the material, thereby contributing to an economical use of energy. Thereby the heat carried along by suction can be advantageously used in the feeding zone 20, as well as intake zone 23 and in the dosage zone 24 for the preliminary heating of the material. Just like as the emission suction 36, 37, it is possible to simply use skillfully overpressure or negative pressure at the process area.

According to the invention for special applications it is possible to couple corresponding devices on the outlet side with an additional cooling zone, optionally on the same level in the same conveying element.

The advantages set forth by the invention become even clearer in the drying of plastic granulates. Advantages result also in treatment of other bulk materials, such as fodder and many more. Besides process continuity, screw conveying has as secondary effects the coupling possibility with further process steps, the dosage on the intake and outlet sides, as well as the simple manner of encapsulating the process area for the capture of emissions and for the application of negative pressure which is advantageous in certain cases.

Reference Numerals 1 screw housing, lower part
2 screw
3 screw housing
20 material feeder
21 fed material
22 driving shaft of screw
23 intake zone
24 dosage zone
25 tempering zone
26 tubular screw shell
27 support for installation
28 infrared radiator
29 partially treated material
30 extensively treated material
31 discharge slide
32 support corotating with the shaft (22) with adjustable support height
33 fixed support with adjustable height
34 contactless temperature-measuring sensor
35 spiral band
36 waste air suction or also pressure application
37 conveying and filtering unit or also vacuum pump respectively compressor
38 air recycling duct
39 release of waste air

We claim:

1. Device for the thermal treatment of bulk material with a screw conveyor transporting the bulk material which is equipped with infrared heat radiators in a tempering zone (25), characterized in that the infrared heat radiators are mounted in a radiation-permeable screw shaft.

2. Device for the thermal treatment of bulk material with a screw conveyor transporting the bulk material which is equipped with infrared heat radiators in a tempering zone (25), characterized in that the infrared heat radiators are arranged in the screw conveyors according to the spiral band principle or in screw conveyors in the central area of the rotation diameter.

3. Device according to claim 2, characterized in that the infrared heat radiators are mounted on a support (27) for the installations and that this support is height-adjustable.

4. Device according to claim 1, characterized in that the screw has a an intake zone (23) and/or a dosage zone (24) preceding the tempering zone (25).

5. Device according to claim 1, using a closed tubular screw shell, characterized in that an evacuation by suction of the emission from the process area takes place or an atmospheric pressure which differs form the surroundings is applied to a process area.

6. Device according to claim 1, characterized in that infrared heat radiators are rod-shaped and fixed.

7. Device according to claim 1, characterized in that several infrared heat radiators are mounted, which are separately switchable.

8. Device according to claim 1, characterized in that the filling ratio ($\phi$) of the tempering zone (25) assigned to the conveyor screw (2) is adjustable.

9. Device according to claim 1, characterized in that the conveyor screw (2) and the walls of a screw trough (9) have an infrared-reflecting coating or are made of an infrared-reflecting material.

10. Device according to claim 1, characterized in that the intake zone (23) and/or the dosage zone (24) of the conveyor screw (2) is designed with respect to the thread volume in such a manner that the respective amount of bulk material corresponds to the filling ratio ($\phi$) to be set in the tempering zone (25) of the conveyor screw (2).

11. Device according to claim 1, characterized in that the conveyor screw (2) is designed in its tempering area (25) with respect to its pitch and geometry so that a filling ratio ($\phi$) between 0.02 to 0.15 can be set.

* * * * *